No. 870,309. PATENTED NOV. 5, 1907.
H. W. NEAL.
DAMPER.
APPLICATION FILED APR. 6, 1907.
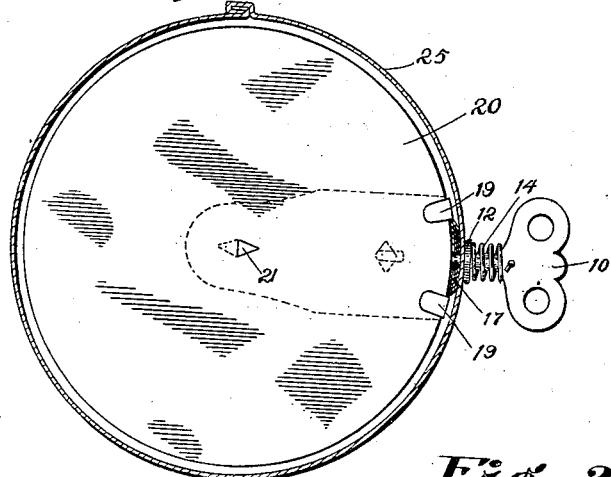
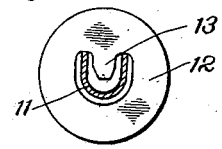
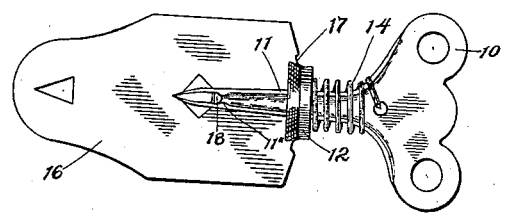
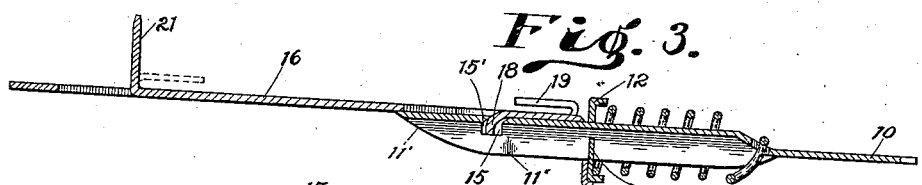
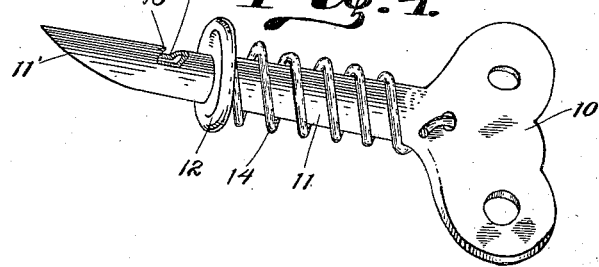
Witnesses
K. R. Clendening
Thomas W. McMeans
Inventor,
Harry W. Neal,
By Bradford Hood
Attorneys.
THE NORRIS PETERS CO., WASHINGTON, D. C.

UNITED STATES PATENT OFFICE.

HARRY W. NEAL, OF INDIANAPOLIS, INDIANA, ASSIGNOR TO HIMSELF, WILLARD HARMON, AND CHARLES E. HALL, OF INDIANAPOLIS, INDIANA, A COPARTNERSHIP.

DAMPER.

No. 870,309.

Specification of Letters Patent.

Patented Nov. 5, 1907.

Application filed April 6, 1907. Serial No. 366,660.

*To all whom it may concern:*

Be it known that I, HARRY W. NEAL, a citizen of the United States, residing at Indianapolis, in the county of Marion and State of Indiana, have invented certain new and useful Improvements in Dampers, of which the following is a specification.

The object of my invention is to produce, preferably from sheet metal, a damper-carrier for large pipes.

The accompanying drawings illustrate my invention. Figure 1 is a side elevation of a device embodying my invention, the pipe being shown in section; Fig. 2, a side elevation of my device showing the side opposite that illustrated in Fig. 1; Fig. 3, a longitudinal section of my device about full size; Fig. 4, a perspective of the shank member, and Fig. 5, a transverse section of such shank member.

In the drawings, 10 indicates the widened upper end of a shank member, the shank 11 of which is preferably formed by stamping up a strip of sheet metal into a U-shaped section, the end of which is sharpened as shown at 11′. Slipped upon the shank 11 is a collar 12 which may be stamped from sheet metal and provided with a tongue 13 which enters between the arms of the U-shaped shank 11, said arms being drawn together at 11″ in order to prevent the tongue 13 from passing between, thus preventing the collar from slipping off from the shank. A helical spring 14 is mounted on shank 11 between the handle 10 and the collar 12. Formed in shank 11 near the outer end is a notch 15 which enters the body of the shank nearly squarely, but slightly overhanging backwards as at 15′.

Coöperating with the shank member is a damper-carrying plate 16 which, at one end, is provided with a down-turned portion 17 lying practically at right angles to the main body 16 and perforated to receive and coöperate with the shank 11. Plate 16 is also provided with a tongue 18 which is stamped up out of the main body 16 and turned from the plane thereof so as to enter the notch 15 of shank 11. Plate 16 is also provided at its shank-receiving end with a pair of tongues 19 which lie substantially parallel with the main body 16 a distance therefrom sufficient to permit the entrance of the edge of the damper 20. Stamped up from body 16 near its outer end is a tongue 21 which is adapted to pierce the damper plate 20 and then being turned down upon said plate to hold it in place as indicated in dotted lines in Fig. 3.

The operation is as follows: A damper plate of the required size is cut and fastened to the plate 16 in the manner described and placed within the pipe 25. The sharpened end 11′ of shank 11 is then driven through the pipe 25 and inserted through the perforated lip 17 of plate 16, collar 12 engaging the pipe and the spring 14 being compressed until tongue 18 enters notch 15, whereupon the overhanging portion 15′ of said notch will be held in engagement with tongue 18 by the action of the spring 14.

It will be noticed that the parts may be very cheaply made and that they are in such form as to be readily assembled by unskilled labor.

I claim as my invention:

1. A damper support comprising a main plate 16 having a tongue 18 and a perforated tongue 17, other tongues carried by said plate for receiving and holding a damper plate, and a sheet metal shank member having a U-shaped shank adapted to enter the perforated tongue 17 and provided near its end with a notch adapted to receive the tongue 18, a collar slidably mounted on said shank and provided with a tongue lying between the arms of the shank, and a spring mounted on the shank and engaging said collar, all substantially as and for the purpose set forth.

2. A damper support comprising a main plate 16 having a tongue 18 and a perforated tongue 17, other tongues carried by said plate for receiving and holding a damper plate, and a shank member adapted to enter the perforated tongue and provided near its inner end with a notch adapted to receive the adjacent tongue 18 of the main plate, and a spring carried by the shank member to act longitudinally thereof against the main plate, substantially as described.

3. A damper support comprising a main plate 16 having a tongue 18 and a perforated tongue 17, and a sheet metal shank member having a U-shaped shank adapted to enter the perforated tongue 17 and provided near its end with a notch adapted to receive the tongue 18, a collar slidably mounted on said shank and a spring mounted on the shank and engaging said collar, all substantially as and for the purpose set forth.

In witness whereof, I, have hereunto set my hand and seal at Indianapolis, Indiana, this 1st day of April, A. D. one thousand nine hundred and seven.

HARRY W. NEAL. [L. S.]

Witnesses:
ARTHUR M. HOOD,
THOMAS W. MCMEANS.